United States Patent
Cao

(10) Patent No.: US 9,900,416 B2
(45) Date of Patent: Feb. 20, 2018

(54) INFORMATION PROCESSING METHOD, INFORMATION PROCESSING DEVICE, AND APPARATUS

(71) Applicant: Yulong Computer Telecommunication Scientific (Shenzhen) Co., Ltd., Shenzhen, Guangdong (CN)

(72) Inventor: Yi Cao, Guangdong (CN)

(73) Assignee: Yulong Computer Telecommunications Scientific (Shenzhen) Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/431,300

(22) Filed: Feb. 13, 2017

(65) Prior Publication Data

US 2017/0155748 A1 Jun. 1, 2017

Related U.S. Application Data

(63) Continuation of application No. PCT/CN2014/092617, filed on Nov. 29, 2014.

(30) Foreign Application Priority Data

Sep. 28, 2014 (CN) .......................... 2014 1 0510579

(51) Int. Cl.
*H04W 12/08* (2009.01)
*H04M 1/2745* (2006.01)
*H04M 1/725* (2006.01)

(52) U.S. Cl.
CPC ..... *H04M 1/274533* (2013.01); *H04M 1/725* (2013.01)

(58) Field of Classification Search
CPC ...... H04M 15/80; H04M 15/00; H04M 15/58; H04M 15/765; H04M 1/72522; H04M 1/72561; H04W 12/08; H04W 12/06; H04W 12/02; H04W 4/001; H04W 84/12; H04W 88/06
See application file for complete search history.

(56) References Cited

U.S. PATENT DOCUMENTS

2009/0254572 A1* 10/2009 Redlich .................. G06Q 10/06
2010/0250497 A1* 9/2010 Redlich .................. F41H 13/00
707/661

(Continued)

FOREIGN PATENT DOCUMENTS

CN 1779641 A 5/2006
CN 101894042 A 11/2010
(Continued)

*Primary Examiner* — Diane Mizrahi
(74) *Attorney, Agent, or Firm* — Young Basile Hanlon & MacFarlane, P.C.

(57) ABSTRACT

An information processing method and device, and an apparatus used for a terminal with multiple operation systems include: according to the content of information received in the current operation system, the type of the information is determined; according to the type of the information, the operation system for processing the information is determined, and the information is processed by the operation system. The current operation system can determine the operation system for processing the information according to the content and the type of the information received by a terminal.

14 Claims, 5 Drawing Sheets

(56) References Cited

U.S. PATENT DOCUMENTS

2012/0115435 A1  5/2012  Oren
2012/0142316 A1  6/2012  Park

FOREIGN PATENT DOCUMENTS

| CN | 102291480 A | 12/2011 |
| CN | 103078989 A | 5/2013 |
| CN | 103413089 A | 11/2013 |
| CN | 103458125 A | 12/2013 |

* cited by examiner

| Security contact | | |
|---|---|---|
| Name 1 | Phone number 1 | |
| Name 2 | Phone number 2 | |
| ... | | |

FIG. 3A

| Shared field | | |
|---|---|---|
| Phone number 1 | Phone number 2 | ... |

FIG. 3B

INFORMATION PROCESSING METHOD, INFORMATION PROCESSING DEVICE, AND APPARATUS

CROSS-REFERENCE TO RELATED APPLICATION(S)

This application is a continuation of PCT/CN2014/092617, filed on Nov. 29, 2014, which claims the benefit of priority to Chinese Patent Application No. 201410510579.6, filed on Sep. 28, 2014, the contents of which are herein incorporated by reference in their entireties.

TECHNICAL FIELD

The present disclosure relates to the field of terminal technology, and particularly to an information processing method, an information processing device, and an apparatus.

BACKGROUND

Existing dual-system terminals generally include a security system and a normal system. Both the security system and the normal system have contacts, short message (SMS), multimedia message (MMS), email, call log and other applications. Generally, users can set security data, which is contact-centric and can include the contact phone number, SMS, MMS, an email, call log and other related data. The security data can only be stored or read out in the security system, and all normal data of the normal system can be shared to the security system.

However, when a terminal receives information in the normal system, it is impossible for the terminal to identify which operation system this information is related to. Take contacts for example, which can divide into security contacts and normal contacts, among which the security contact can only be stored or read out in the security system. When the terminal receives an incoming call of contact A in the normal system, it is impossible for the normal system to identify whether contact A is a security contact that can only be stored and read out in the security system, and therefore, it is difficult to comprehensively protect security data and information related to the security data in the security system. The terminal can identify contact A as a security contact only when the incoming call of contact A is received in the security system.

Therefore, it is desirable to provide a new technical solution in which a security contact for a security system can be identified in a normal system, in other words, it is desirable to provide a new technical solution in which an operation system associated with the received information can be determined in a current operation system, so as to comprehensively protect the information received by the terminal that relates to data of any one of the operation systems.

SUMMARY

Based on the above-mentioned problems, a new technical solution is proposed in the present disclosure, in which an operation system associated with received information can be determined in a current operation system, thereby completely protecting the security of data of any operation system related information received by the terminal. "Any" can include one of multiple operation systems, such as, for example, either of two operation systems. "Any" here is used interchangeably with "either."

In view of this, according to one aspect of the present disclosure, it is provided an information processing method. The method is applicable to a terminal with multiple operation systems and includes: according to the content of information received in a current operation system, the type of the information is determined; according to the type of the information, an operation system for processing the information is determined, and the information is processed by the operation system.

In this technical scheme, when the terminal receives calls, text messages, e-mail, or other information in the current operation system, the type of the information can be determined according to the content included in the information, and the operation system for processing the information can be selected. For example, a terminal is provided with a normal system and a security system, contact A is included in the contacts of the security system and is set as a private contact of the security system by user, however, contact A is not included in the contacts of the normal system. When the terminal receives an incoming call, it is determined from the contact number of the incoming call that the incoming call is from private contact A of the security system, that is, the coming call is information relating to private contact A of the security system. Therefore, when an incoming call is received, through the above judgment, the terminal can switch directly to or remind the user to switch to the security system to answer or otherwise process the incoming call. Through the technical scheme, when the current operation system receives the information, it can determine the operation system for processing the information according to the content of the information. Specifically, it is possible for the current operation system to recognize, based on the content of the information, whether the information is information related to a designated contact of any operation system, and select an operation system for processing the information based on the determination result. Therefore, it is possible to enhance the security of the information received by the terminal, to prevent the received privacy information related to any operating system from being revealed, to comprehensively protect the information received by the terminal that relates to data of any one of the operation systems, and to maximize the protection of the privacy of users.

In the above-mentioned technical scheme, the content of the information received includes at least one of the following: the avatar, name, email address, and phone number of the contact of the information and the type of the information; the type of the information includes a security type and a non-security type, among which information of the security type is information related to a designated contact in any operation system, and information of the non-security type is information related to a contact other than the designated contact.

In this technical scheme, the content of the information can be the basis for determining the type of the information, among which the type of the information can include but not limited to at least one of the following: the avatar, name, email address, and phone number of the contact of the information and the type of the information. Macroscopically, the type of information can include a security type and a non-security type. For example, suppose a terminal is provided with operation system A and operation system B, and among information received by the terminal, there are two types of security information, that is, information related to a designated contact in operation system A and information related to a designated contact in operation system B; there are two types of non-security information any, that is: information related to a contact other than the designated contact in operation system A and information related to a contact other than the designated contact in operation system B.

In the above-mentioned technical scheme, before the type of the information is determined according to the content of the information received in the current operation system, the method further includes: information of the designated contact of each operation system of the multiple operation systems is stored in the current operation system, among which the information of the designated contact includes at least one of the following: the avatar, name, type, email address, and phone number of the designated contact.

In this technical scheme, by storing the information of the designated contact of each operation system in the current operation system, when information is received, the current operation system can judge whether or not the received information is associated with the stored content, and if yes, the operation system related to the associated content will be selected to process the received information. The stored information of the designated contact of each operation system includes but not limited at least one of the following: the avatar, name, type, email address, and phone number of the designated contact. Since a variety of information of the designated contact will be meaningful only in combination, if the current operation system can only read one individual information, for example, if only the email address of the designated contact is stored in the current operation system, the current operation system can only identify according to the stored email address that the contact that sent the email is the designated contact of any operation system, and cannot determine other information of the designated contact according to the stored email address, thus can avoid the revealing of any operation system-related privacy information and maximize the protection of the security of user privacy. Therefore, rather than storing all information of the designated contact in the current operation system, only one or several kinds of information of the designated contact of any operation system can be classified and stored in the current operation system in the form of collections that do not correspond to each other, thereby enhancing the security of the privacy information associated with any one of the operation systems and maximizing the security of user privacy.

In the above-mentioned technical scheme, the process that the type of the information is determined according to the content of the information received in the current operation system includes: according to the content of the received information and information of the designated contact of any operation system stored in the current operation system, it is determined that whether the received information is information related to the designated contact of any operation system.

In this technical scheme, it is possible to determine whether or not the received information is associated with the content stored in the current operation system, and when the received information is associated with the stored content, the operation system related to the associated content will be selected to process the information. For example, a short message (SMS) is received in a terminal having operation system A and operation system B, and the content of this SMS includes the phone number, type, and avatar of the contact, and text message. Upon detecting that the phone number of the contact who pushed the SMS is stored in the current operation system, it can be determined that the stored phone number is the phone number of the designated contact of operation system A, and it can be further determined that operation system A is the operation system for processing the received information.

In the above-mentioned technical scheme, the process that the operation system for processing the information is determined according to the type of the information and the information is processed by the operation system includes: when it is determined that the received information is the information related to the designated contact of the any operation system, the any operation system will be used to process the information; otherwise, the operation system for processing the received information is determined according to a setting command received, and the determined operation system will be used to process the information.

In this technical scheme, if the received information is associated with information stored in the current operation system, the received information can be processed by an operation system corresponding to the stored information; otherwise, if the received information is not information associated with the designated contact of any operation system, it can be set that the received information will be processed directly in the current operation system, or it is also possible to determine whether the contact who pushed the information is a contact other than the designated contact of any operation system, and if yes, the any operation system will be used to process the information, otherwise, the information will be processed in the current operation system.

In the above-mentioned technical scheme, as an implementation, the method can further include: upon detecting that the information of the designated contact of the any operation system is updated, the information of the designated contact of the any operation system stored in the current operation system can be updated synchronously.

In this technical solution, a collection of part of the information of the designated contact of any operation system is stored in the current operation system, and when part of the information of the designated contact of any operation system is changed, the changes will be synchronized to the current operation system, so as to ensure that the current operation system can accurately determine the type of the received information based on the content of the information, in other words, to accurately determine whether the information is related to part of the information of the designated contact of any operation system, so as to determine the operation system for processing the received information. Through this technical scheme, the accuracy of judgment can be improved, and the security of user privacy can be better protected.

According to another aspect of the present disclosure, it is provided an information processing device. The device is applicable to a terminal having multiple operation systems and includes: a first determining unit, configured to determine the type of information received in a current operation system according to the content of the information; and a second determining unit, configured to determine an operation system for processing the information according to the type of the information; and a processor, configured to use the operation system to process the information.

In this technical scheme, when the terminal receives calls, text messages, e-mail, or other information in the current operation system, the type of the information can be determined according to the content included in the information, and the operation system for processing the information can be selected. For example, a terminal is provided with a normal system and a security system, Contact A is included in the contacts of the security system and is set as a private contact of the security system by user, however, Contact A is not included in the contacts of the normal system. When the terminal receives an incoming call, it is determined from the contact number of the incoming call that the incoming call is from private Contact A of the security system, that is, the coming call is information relating to private Contact A of the security system. Therefore, when an incoming call is received, through the above judgment, the terminal can switch directly to or remind the user to switch to the security system to answer or otherwise process the incoming call. Through the technical scheme, when the current operation system receives the information, it can determine the operation system for processing the information according to the content of the information. Specifically, it is possible for the current operation system to recognize, based on the content of the information, whether the information is information related to a designated contact of any operation system, and select an operation system for processing the information based on the determination result. Therefore, it is possible to enhance the security of the information received by the terminal, to prevent the received privacy information related to any operating system from being revealed, to comprehensively protect the information received by the terminal that relates to data of any one of the operation systems, and to maximize the protection of the privacy of users.

In the above-mentioned technical scheme, the content of the information received includes at least one of the following: the avatar, name, email address, phone number of the contact who pushed the information and the type of the information; the type of the information includes a security type and a non-security type, among which information of the security type is information related to a designated contact in any operation system, and information of the non-security type is information related to a contact other than the designated contact.

In this technical scheme, the content of the information can be the basis for determining the type of the information, among which the type of the information can include but not limited to at least one of the following: the avatar, name, email address, and phone number of the contact who pushed the information and the type of the information. Macroscopically, the type of information can include a security type and a non-security type. For example, suppose a terminal is provided with operation system A and operation system B, and among information received by the terminal, there are two types of security information, that is, information related to a designated contact in operation system A and information related to a designated contact in operation system B; there are two types of non-security information any, that is: information related to a contact other than the designated contact in operation system A and information related to a contact other than the designated contact in operation system B.

In the above-mentioned technical scheme, as an implementation, the information processing device can further include: a storage unit, configured to store, in the current operation system, information of the designated contact of each operation system of the multiple operation systems, among which the information of the designated contact includes at least one of the following: the avatar, name, email address, and phone number of the designated contact and the type of the information.

In this technical scheme, by storing the information of the designated contact of each operation system in the current operation system, when information is received, the current operation system can judge whether or not the received information is associated with the stored content, and if yes, the operation system related to the associated content will be selected to process the received information. The stored information of the designated contact of each operation system includes but not limited at least one of the following: the avatar, name, email address, and phone number of the designated contact and the type of the information. Since a variety of information of the designated contact will be meaningful only in combination, if the current operation system can only read one individual information, for example, if only the email address of the designated contact is stored in the current operation system, the current operation system can only identify according to the stored email address that the contact that sent the email is the designated contact of any operation system, and cannot determine other information of the designated contact according to the stored email address, thus can avoid the revealing of any operation system-related privacy information and maximize the protection of the security of user privacy. Therefore, rather than storing all information of the designated contact in the current operation system, only one or several kinds of information of the designated contact of any operation system can be classified and stored in the current operation system in the form of collections that do not correspond to each other, thereby enhancing the security of the privacy information associated with any operation system and maximizing the security of user privacy.

In the above-mentioned technical scheme, as an implementation, the first determining unit is configured to determine whether the received information is information related to the designated contact of any operation system according to the content of the received information and information of the designated contact of any operation system stored in the current operation system.

In this technical scheme, it is possible to determine whether or not the received information is associated with the content stored in the current operation system, and when the received information is associated with the stored content, the operation system related to the associated content will be selected to process the information. For example, a short message (SMS) is received in a terminal having operation system A and operation system B, and the content of this SMS includes the phone number, the type, and the avatar of the contact, and text message. Upon detecting that the phone number of the contact who pushed the SMS is stored in the current operation system, it can be determined that the stored phone number is the phone number of the designated contact of operation system A, and it can be further determined that operation system A is the operation system for processing the received information.

In the above-mentioned technical scheme, the second determining unit is further configured to: when it is determined that the received information is information related to the designated contact of the any operation system, determine to use the any operation system to process the information; otherwise, determine the operation system for processing the received information according to a setting command received.

In this technical scheme, if the received information is associated with information stored in the current operation system, the received information can be processed by an operation system corresponding to the stored information; otherwise, if the received information is not information associated with the designated contact of any operation system, it can be set that the received information will be processed directly in the current operation system, or it is also possible to determine whether the contact who pushed the information is a contact other than the designated contact of any operation system, and if yes, the any operation system will be used to process the information, otherwise, the information will be processed in the current operation system.

In the above-mentioned technical scheme, as one implementation, the information processing device can further include: an updating unit, configured to synchronously update the information of the designated contact of the any operation system stored in the current operation system upon detecting that the information of the designated contact of the any operation system is updated.

In this technical solution, a collection of part of the information of the designated contact of any operation system is stored in the current operation system, and when part of the information of the designated contact of any operation system is changed, the changes will be synchronized to the current operation system, so as to ensure that the current operation system can accurately determine the type of the received information based on the content of the information, in other words, to accurately determine whether the information is related to part of the information of the designated contact of any operation system, so as to determine the operation system for processing the received information. Through this technical scheme, the accuracy of judgment can be improved, and the privacy and security of the user can be better protected.

According to a further aspect of the present disclosure, it is provided a terminal with multiple operation systems and includes the information processing device described above. The terminal has all of the advantages of the information processing device of the above-described technical scheme, and will not be described again here.

With aid of the technical schemes described above, it is possible to enhance the security of the information received by the terminal, to prevent the received privacy information related to any operating system from being revealed, to comprehensively protect the information received by the terminal that relates to data of any one of the operation systems, and to maximize the protection of the privacy of users.

BRIEF DESCRIPTION OF THE DRAWINGS

FIG. 3A is a schematic diagram illustrating a secure contact and information thereof illustrated in FIG. 2;

FIG. 3B is a schematic diagram illustrating a shared field of a normal system illustrated in FIG. 2;

DETAILED DESCRIPTION

For a better understanding of the above and other objects, features, and advantages of the present disclosure, the present disclosure will be described in further detail with reference to the accompanying drawings and detailed description.

In the following description, numerous specific details are set forth in order to facilitate a thorough understanding of the present disclosure, however, the present disclosure may be practiced otherwise than as specifically described herein, accordingly, the scope of the present disclosure is not to be limited by the specific implementations disclosed below.

Figure 1:
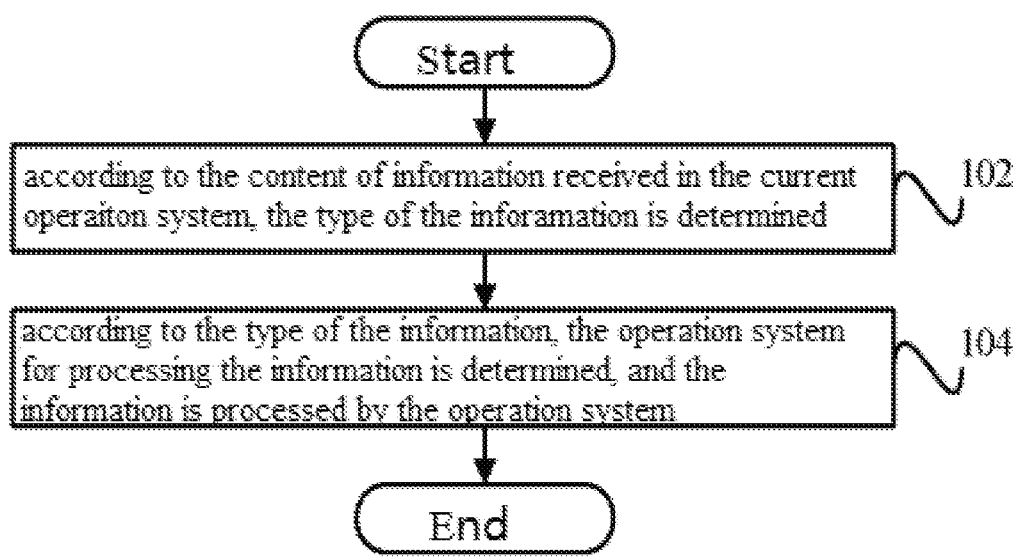
FIG. 1 is a flowchart illustrating an information processing method according to an implementation of the present disclosure.

FIG. 1 is a flowchart illustrating an information processing method according to an implementation of the present disclosure.

As shown in FIG. 1, the information processing device can include the following steps.

S102, according to the content of information received in a current operation system, the type of the information is determined.

S104, according to the type of the information, an operation system for processing the information is determined, and the information is processed by the operation system.

In this technical scheme, when the terminal receives calls, text messages, e-mail, or other information in the current operation system, the type of the information can be determined according to the content included in the information, and the operation system for processing the information can be selected. For example, a terminal is provided with a normal system and a security system, Contact A is included in the contacts of the security system and is set as a private contact of the security system by user, however, Contact A is not included in the contacts of the normal system. When the terminal receives an incoming call, it is determined from the contact number of the incoming call that the incoming call is from private Contact A of the security system, that is, the coming call is information relating to private Contact A of the security system. Therefore, when an incoming call is received, through the above judgment, the terminal can switch directly to or remind the user to switch to the security system to answer or otherwise process the incoming call. Through the technical scheme, when the current operation system receives the information, it can determine the operation system for processing the information according to the content of the information. Specifically, it is possible for the current operation system to recognize, based on the content of the information, whether the information is information related to a designated contact of any operation system, and select an operation system for processing the information based on the determination result. Therefore, it is possible to enhance the security of the information received by the terminal, to prevent the received privacy information related to any operating system from being revealed, to comprehensively protect the information received by the terminal that relates to data of any one of the operation systems, and to maximize the protection of the privacy of users.

In the above-mentioned technical scheme, the content of the information received includes at least one of the following: the avatar, name, email address, phone number of the contact of the information and the type of the information; the type of the information includes a security type and a non-security type, among which information of the security type is information related to a designated contact in any operation system, and information of the non-security type is information related to a contact other than the designated contact. It will be appreciated that the content of the information referred to herein can be obtained from the information per se received by the terminal, for example, business card information of the sender can be attached in the information per se; alternatively, the content of the information can be transmitted simultaneously when the sender transmits the information through other technical means such as Rich Communication Suite (RCS); it is also possible that the receiver obtain the content of the information form a server of the operator. The present disclosure is not limited thereto.

In this technical scheme, the content of the information can be the basis for determining the type of the information, among which the type of the information can include but not limited to at least one of the following: the avatar, name, email address, phone number of the contact of the information and the type of the information. Macroscopically, the type of information can include a security type and a non-security type. For example, suppose a terminal is provided with operation system A and operation system B, and among information received by the terminal, there are two types of security information, that is, information related to a designated contact in operation system A and information related to a designated contact in operation system B; there are two types of non-security information any, that is: information related to a contact other than the designated contact in operation system A and information related to a contact other than the designated contact in operation system B.

In the above-mentioned technical scheme, as an implementation, before Step 102, the method further includes: information of the designated contact of each operation system of the multiple operation systems is stored in the current operation system, among which the information of the designated contact includes at least one of the following: the avatar, name, email address, and phone number of the designated contact and the type of the information.

In this technical scheme, by storing the information of the designated contact of each operation system in the current operation system, when information is received, the current operation system can judge whether or not the received information is associated with the stored content, and if yes, the operation system related to the associated content will be selected to process the received information. The stored information of the designated contact of each operation system includes but not limited at least one of the following: the avatar, name, email address, and phone number of the designated contact and the type of the information. Since a variety of information of the designated contact will be meaningful only in combination, if the current operation system can only read one individual information, for example, if only the email address of the designated contact is stored in the current operation system, the current operation system can only identify according to the stored email address that the contact that sent the email is the designated contact of any operation system, and cannot determine other information of the designated contact according to the stored email address, thus can avoid the revealing of any operation system-related privacy information and maximize the protection of the security of user privacy. Therefore, rather than storing all information of the designated contact in the current operation system, only one or several kinds of information of the designated contact of any operation system can be classified and stored in the current operation system in the form of collections that do not correspond to each other, thereby enhancing the security of the privacy information associated with any operation system and maximizing the security of user privacy. It should be noted that, avatar information of all designated contacts can be used as an avatar collection, name information of all designated contacts can be used as a name collection, email address information of all designated contacts can be used as an email address collection; and phone number of all designated contacts can be used as a phone number collection; there is no correspondence among the avatar collection, the name collection, the email address collection, and the phone number collection. In this way, at least one of the avatar collection, the name collection, the email address collection, and the phone number collection can be stored in the normal system. Since meaning information can only be obtained when several critical information (such as name and phone number) are combined together, the possibility of information revealing of the designated contact in the normal system can be avoided.

In the above-mentioned technical scheme, as an implementation, Step 102 can include: it is determined that whether the received information is information related to the designated contact of any operation system according to the content of the received information and information of the designated contact of any operation system stored in the current operation system.

In this technical scheme, it is possible to determine whether or not the received information is associated with the content stored in the current operation system, and when the received information is associated with the stored content, the operation system related to the associated content will be selected to process the information. For example, a short message (SMS) is received in a terminal having operation system A and operation system B, and the content of this SMS includes the phone number, the type, and the avatar of the contact, and text message. Upon detecting that the phone number of the contact who pushed the SMS is stored in the current operation system, it can be determined that the stored phone number is the phone number of the designated contact of operation system A, and it can be further determined that operation system A is the operation system for processing the received information.

In the above-mentioned technical scheme, as an implementation, Step 104 can include: when it is determined that the received information is information related to the designated contact of the any operation system, the any operation system will be used to process the information; otherwise, the operation system for processing the received information is determined according to a setting command received, and the determined operation system will be used to process the information.

In this technical scheme, if the received information is associated with information stored in the current operation system, the received information can be processed by an operation system corresponding to the stored information; otherwise, if the received information is not information associated with the designated contact of any operation system, it can be set that the received information will be processed directly in the current operation system, or it is also possible to determine whether the contact who pushed the information is a contact other than the designated contact of any operation system, and if yes, the any operation system will be used to process the information, otherwise, the information will be processed in the current operation system.

In the above-mentioned technical scheme, as an implementation, the method can further include: upon detecting that the information of the designated contact of the any operation system is updated, the information of the designated contact of the any operation system stored in the current operation system can be updated synchronously.

In this technical solution, a collection of part of the information of the designated contact of any operation system is stored in the current operation system, and when part of the information of the designated contact of any operation system is changed, the changes will be synchronized to the current operation system, so as to ensure that the current operation system can accurately determine the type of the received information based on the content of the information, in other words, to accurately determine whether the information is related to part of the information of the designated contact of any operation system, so as to determine the operation system for processing the received information. Through this technical scheme, the accuracy of judgment can be improved, and the security of user privacy can be better protected.

Figure 2:
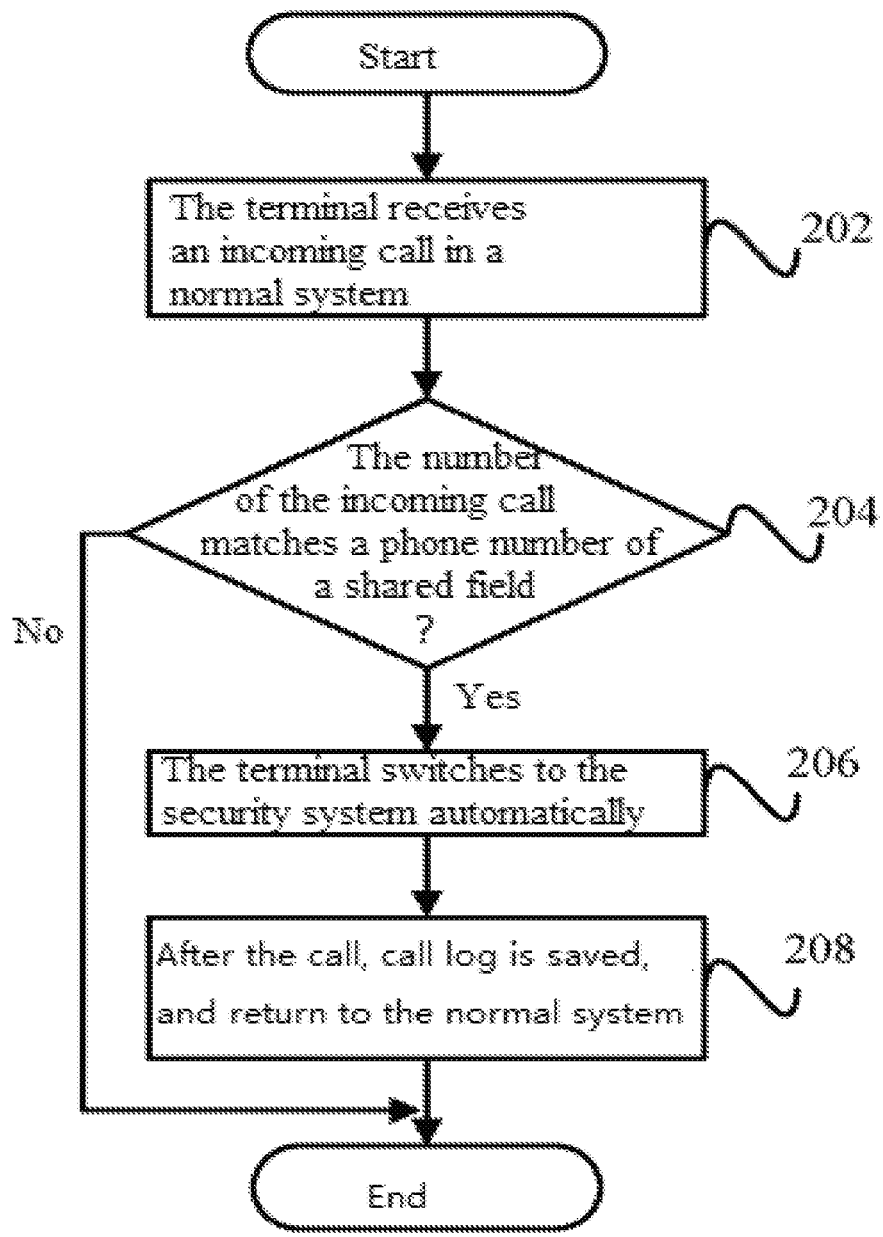
FIG. 2 is a flowchart illustrating an information processing method according to another implementation of the present disclosure.

FIG. 2 is a flowchart illustrating an information processing method according to another implementation of the present disclosure.

The information processing method according to another implementation of the present disclosure is applicable to a dual system based terminal having a normal system and a security system, and as illustrate in FIG. 2, the method can include the follows:

Step 202, the terminal receives an incoming call in the normal system, among which the incoming call contains the contact phone number of the incoming call.

Step 204, it is determined that whether the phone number of the incoming call matches the phone number of a shared field; if yes, proceed to Step 206, otherwise, the process ends. The security system can set the phone number of a secure contact to be the shared field with the normal system and store the shared field in the normal system. By determining whether the contact phone number of the incoming call matches or relates to the phone number of the shared field, the terminal can determine whether the contact of the incoming call is the secure contact of the security system. Furthermore, when the phone number of the secure contact of the security system is updated, the phone number of the shared field stored in the normal system will be updated synchronously, so as to ensure the accuracy of the basis of judgment.

Step 206, the terminal switches to the security system automatically. If it is determined that the contact of the incoming call is the secure contact of the security system, the terminal can switch to the security system to answer or otherwise process the incoming call.

Step 208, after the call is ended, the terminal will save a call log and return to the normal system. After the call is ended, the call log can be saved for the security system, and in order to ensure the security of the security system, the terminal will return to the normal system automatically after the call is ended, which can avoid the revealing of privacy information of the security system caused by staying in the security system after the call is ended.

Through the above technical scheme, it is possible to determine whether the contact of the incoming call is the secure contact without switching to the security system, and therefore, it is possible to enhance the security of the information received by the terminal, to prevent the received privacy information related to any operating system from being revealed, to comprehensively protect the information received by the terminal that relates to data of any one of the operation systems, and to maximize the protection of the privacy of users.

FIG. 3A is a schematic diagram illustrating a secure contact and information thereof illustrated in FIG. 2.

The secure contact is a privacy contact set in the security system, and can only be saved and read out by the security system. As shown in FIG. 3A, information of the secure contact includes the name and phone number of each secure contact; besides, information of the secure contact can includes the avatar, type and other information of each secure contact. It should be noted that, avatar information of all designated contacts can be used as an avatar collection, name information of all designated contacts can be used as a name collection, email address information of all designated contacts can be used as an email address collection; and phone number of all designated contacts can be used as a phone number collection; there is no correspondence among the avatar collection, the name collection, the email address collection, and the phone number collection. In this way, at least one of the avatar collection, the name collection, the email address collection, and the phone number collection can be stored in the normal system. Since meaning information can only be obtained when several critical information (such as name and phone number) are combined together, the possibility of information revealing of the designated contact in the normal system can be avoided.

FIG. 3B is a schematic diagram illustrating a shared field of a normal system in the implementation illustrated in FIG. 2.

The security system can set the phone number of the secure contact to be a shared field with the normal system, that is, the shared field can include phone numbers of multiple secure contacts. The security system can store the shared field in the normal system, and by determining whether the contact phone number of the incoming call is the same as or relates to the phone number of the shared field, the terminal can determine whether the contact of the incoming call is the secure contact of the security system. Furthermore, when the phone number of the secure contact of the security system is updated, the phone number of the shared field stored in the normal system will be updated synchronously, so as to ensure the accuracy of the basis of judgment. In this way, when an incoming call is received in the normal system, the normal system can identify whether the contact of the incoming call is the secure contact of the security system according to the phone number of the shared field.

When a SMS is received in the normal system, with aid of the above-mentioned technical scheme, similarly, the normal system can identify whether the contact sending the SMS is the secure contact of the security system according to the phone number of the shared field.

Figure 4:
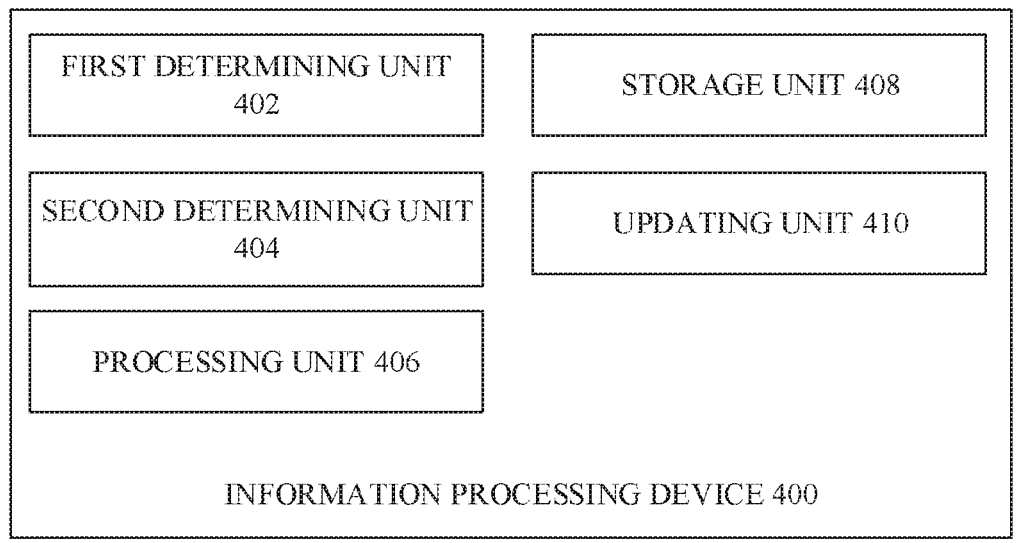
FIG. 4 is a block diagram illustrating the information processing device according to an implementation of the present disclosure.

FIG. 4 is a block diagram illustrating the information processing device according to an implementation of the present disclosure.

As shown in FIG. 4, the information processing device 400 according to an implementation of the present disclosure includes: a first determining unit 402, configured to determine the type of information received in a current operation system according to the content of the information; and a second determining unit 404, configured to determine an operation system for processing the information according to the type of the information; and a processor 406, configured to use the operation system to process the information.

In this technical scheme, when the terminal receives calls, text messages, e-mail, or other information in the current operation system, the type of the information can be determined according to the content included in the information, and the operation system for processing the information can be selected. For example, a terminal is provided with a normal system and a security system, Contact A is included in the contacts of the security system and is set as a private contact of the security system by user, however, Contact A is not included in the contacts of the normal system. When the terminal receives an incoming call, it is determined from the contact number of the incoming call that the incoming call is from private Contact A of the security system, that is, the coming call is information relating to private Contact A of the security system. Therefore, when an incoming call is received, through the above judgment, the terminal can switch directly to or remind the user to switch to the security system to answer or otherwise process the incoming call. Through the technical scheme, when the current operation system receives the information, it can determine the operation system for processing the information according to the content of the information. Specifically, it is possible for the current operation system to recognize, based on the content of the information, whether the information is information related to a designated contact of any operation system, and select an operation system for processing the information based on the determination result. Therefore, it is possible to enhance the security of the information received by the terminal, to prevent the received privacy information related to any operating system from being revealed, to comprehensively protect the information received by the terminal that relates to data of any one of the operation systems, and to maximize the protection of the privacy of users.

In the above-mentioned technical scheme, the content of the information received includes at least one of the following: the avatar, name, email address, phone number of the contact of the information and the type of the information; the type of the information includes a security type and a non-security type, among which information of the security type is information related to a designated contact in any operation system, and information of the non-security type is information related to a contact other than the designated contact. It will be appreciated that the content of the information referred to herein can be obtained from the information per se received by the terminal, for example, business card information of the sender can be attached in the information per se; alternatively, the content of the information can be transmitted simultaneously when the sender transmits the information through other technical means such as Rich Communication Suite (RCS); it is also possible that the receiver obtain the content of the information form a server of the operator. The present disclosure is not limited thereto.

In this technical scheme, the content of the information can be the basis for determining the type of the information, among which the type of the information can include but not limited to at least one of the following: the avatar, name, email address, and phone number of the contact who pushed the information and the type of the information.

Macroscopically, the type of information can include a security type and a non-security type. For example, suppose the terminal is provided with operation system A and operation system B, and among information received by the terminal, there are two types of security information, that is, information related to a designated contact in operation system A and information related to a designated contact in operation system B; there are two types of non-security information any, that is: information related to a contact other than the designated contact in operation system A and information related to a contact other than the designated contact in operation system B.

In the above-mentioned technical scheme, as an implementation, the information processing device can further include: a memory 408, configured to store information of the designated contact of each operation system of the multiple operation systems in the current operation system, among which the information of the designated contact includes at least one of the following: the avatar, name, email address, and phone number of the designated contact and the type of the information.

In this technical scheme, by storing the information of the designated contact of each operation system in the current operation system, when information is received, the current operation system can judge whether or not the received information is associated with the stored content, and if yes, the operation system related to the associated content will be selected to process the received information. The stored information of the designated contact of each operation system includes but not limited at least one of the following: the avatar, name, email address, and phone number of the designated contact and the type of the information. Since a variety of information of the designated contact will be meaningful only in combination, if the current operation system can only read one individual information, for example, if only the email address of the designated contact is stored in the current operation system, the current operation system can only identify according to the stored email address that the contact that sent the email is the designated contact of any operation system, and cannot determine other information of the designated contact according to the stored email address, thus can avoid the revealing of any operation system-related privacy information and maximize the protection of the security of user privacy. Therefore, rather than storing all information of the designated contact in the current operation system, only one or several kinds of information of the designated contact of any operation system can be classified and stored in the current operation system in the form of collections that do not correspond to each other, thereby enhancing the security of the privacy information associated with any operation system and maximizing the security of user privacy. It should be noted that, avatar information of all designated contacts can be used as an avatar collection, name information of all designated contacts can be used as a name collection, email address information of all designated contacts can be used as an email address collection; and phone number of all designated contacts can be used as a phone number collection; there is no correspondence among the avatar collection, the name collection, the email address collection, and the phone number collection. In this way, at least one of the avatar collection, the name collection, the email address collection, and the phone number collection can be stored in the normal system. Since meaning information can only be obtained when several critical information (such as name and phone number) are combined together, the possibility of information revealing of the designated contact in the normal system can be avoided.

In the above-mentioned technical scheme, as an implementation, the first determining unit 402 is configured to: determine whether the received information is information related to the designated contact of any operation system according to the content of the received information and information of the designated contact of any operation system stored in the current operation system.

In this technical scheme, it is possible to determine whether or not the received information is associated with the content stored in the current operation system, and when the received information is associated with the stored content, the operation system related to the associated content will be selected to process the information. For example, a short message (SMS) is received in a terminal having operation system A and operation system B, among which the SMS content includes a contact phone number and message text. Upon detecting that the phone number of the contact who pushed the SMS is stored in the current operation system, it can be determined that the stored phone number is the phone number of the designated contact of operation system A, and it can be further determined that operation system A is the operation system for processing the received information.

In the above-mentioned technical scheme, as an implementation, the second determining unit 404 is configured to: when it is determined that the received information is information related to the designated contact of the any operation system, determine to use the any operation system to process the information; otherwise, determine the operation system for processing the received information according to a setting command received.

In this technical scheme, if the received information is associated with information stored in the current operation system, the received information can be processed by an operation system corresponding to the stored information; otherwise, if the received information is not information associated with the designated contact of any operation system, it can be set that the received information will be processed directly in the current operation system, or it is also possible to determine whether the contact who pushed the information is a contact other than the designated contact of any operation system, and if yes, the any operation system will be used to process the information, otherwise, the information will be processed in the current operation system.

In the above-mentioned technical scheme, as an implementation, the information processing device further includes: an updating unit 410, configured to synchronously update the information of the designated contact of the any operation system stored in the current operation system if it is detected that the information of the designated contact of the any operation system is updated.

In this technical solution, a collection of part of the information of the designated contact of any operation system is stored in the current operation system, and when part of the information of the designated contact of any operation system is changed, the changes will be synchronized to the current operation system, so as to ensure that the current operation system can accurately determine the type of the received information based on the content of the information, in other words, to accurately determine whether the information is related to part of the information of the designated contact of any operation system, so as to determine the operation system for processing the received information. Through this technical scheme, the accuracy of judgment can be improved, and the security of user privacy can be better protected.

Figure 5:
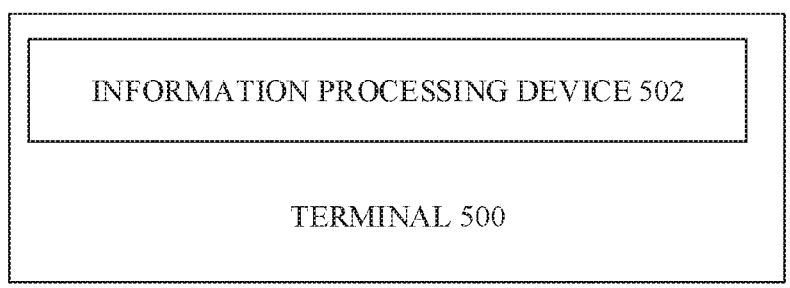
FIG. 5 is a block diagram illustrating the terminal according to an implementation of the present disclosure.

FIG. 5 is a block diagram illustrating a terminal according to an implementation of the present disclosure.

As shown in FIG. 5, a terminal 500 according to an implementation of the present disclosure includes: an information processing device 502 (equivalents to the information processing device 400 illustrated in FIG. 4 according to the implementation of the present disclosure), configured to determine the type of information received in a current operation system according to the content of the information, and determine an operation system for processing the information according to the type of the information. The determined operation system will be used to process the information.

In this technical scheme, when the terminal 500 receives calls, text messages, e-mail, or other information in the current operation system, the type of the information can be determined according to the content included in the information, and the operation system for processing the information can be selected. For example, a terminal is provided with a normal system and a security system, Contact A is included in the contacts of the security system and is set as a private contact of the security system by user, however, Contact A is not included in the contacts of the normal system. When the terminal receives an incoming call, it is determined from the contact number of the incoming call that the incoming call is from private Contact A of the security system, that is, the coming call is information relating to private Contact A of the security system. Therefore, when an incoming call is received, through the above judgment, the terminal can switch directly to or remind the user to switch to the security system to answer or otherwise process the incoming call. Through the technical scheme, when the current operation system receives the information, it can determine the operation system for processing the information according to the content of the information. Specifically, it is possible for the current operation system to recognize, based on the content of the information, whether the information is information related to a designated contact of any operation system, and select an operation system for processing the information based on the determination result. Therefore, it is possible to enhance the security of the information received by the terminal 500, to prevent the received privacy information related to any operating system from being revealed, to comprehensively protect the information received by the terminal 500 that relates to data of any one of the operation systems, and to maximize the protection of the privacy of users.

In the above-mentioned technical scheme, the content of the information received by the terminal 500 can include at least one of the following: the avatar, name, email address, and phone number of the contact of the information and the type of the information; the type of the information includes a security type and a non-security type, among which information of the security type is information related to a designated contact in any operation system, and information of the non-security type is information related to a contact other than the designated contact.

In this technical scheme, the content of the information can be the basis for determining the type of the information, among which the type of the information can include but not limited to at least one of the following: the avatar, name, email address, and phone number of the contact of the information and the type of the information. Macroscopically, the type of information can include a security type and a non-security type. For example, suppose the terminal 500 is provided with operation system A and operation system B, and among information received by the terminal, there are two types of security information, that is, information related to a designated contact in operation system A and information related to a designated contact in operation system B; there are two types of non-security information any, that is: information related to a contact other than the designated contact in operation system A and information related to a contact other than the designated contact in operation system B.

In the above-mentioned technical scheme, as an implementation, the information processing device 502 of the terminal 500 can be configured to store information of the designated contact of each operation system of the multiple operation systems in the current operation system, among which the information of the designated contact includes at least one of the following: the avatar, name, email address, and phone number of the designated contact and the type of the information.

In this technical scheme, by storing the information of the designated contact of each operation system in the current operation system, when information is received, the current operation system can judge whether or not the received information is associated with the stored content, and if yes, the operation system related to the associated content will be selected to process the received information. The stored information of the designated contact of each operation system includes but not limited at least one of the following: the avatar, name, email address, and phone number of the designated contact and the type of the information. Since a variety of information of the designated contact will be meaningful only in combination, if the current operation system can only read one individual information, for example, if only the email address of the designated contact is stored in the current operation system, the current operation system can only identify according to the stored email address that the contact that sent the email is the designated contact of any operation system, and cannot determine other information of the designated contact according to the stored email address, thus can avoid the revealing of any operation system-related privacy information and maximize the protection of the security of user privacy. Therefore, rather than storing all information of the designated contact in the current operation system, only one or several kinds of information of the designated contact of any operation system can be classified and stored in the current operation system in the form of collections that do not correspond to each other, thereby enhancing the security of the privacy information associated with any operation system and maximizing the security of user privacy. It should be noted that, avatar information of all designated contacts can be used as an avatar collection, name information of all designated contacts can be used as a name collection, email address information of all designated contacts can be used as an email address collection; and phone number of all designated contacts can be used as a phone number collection; there is no correspondence among the avatar collection, the name collection, the email address collection, and the phone number collection. In this way, at least one of the avatar collection, the name collection, the email address collection, and the phone number collection can be stored in the normal system. Since meaning information can only be obtained when several critical information (such as name and phone number) are combined together, the possibility of information revealing of the designated contact in the normal system can be avoided.

In the above-mentioned technical scheme, as an implementation, the information processing device 502 of the terminal 500 can be configured to determine, according to the content of the received information and information of the designated contact of any operation system stored in the current operation system, whether the received information is information related to the designated contact of any operation system.

In this technical scheme, it is possible to determine whether or not the received information is associated with the content stored in the current operation system, and when the received information is associated with the stored content, the operation system related to the associated content will be selected to process the information. For example, a short message (SMS) is received in a terminal having operation system A and operation system B, among which the SMS content includes a contact phone number and message text. Upon detecting that the phone number of the contact who pushed the SMS is stored in the current operation system, it can be determined that the stored phone number is the phone number of the designated contact of operation system A, and it can be further determined that operation system A is the operation system for processing the received information.

In the above-mentioned technical scheme, as an implementation, the information processing device 502 of the terminal 500 is configured to: determine to use the any operation system to process the information if it is determined that the received information is information related to the designated contact of the any operation system; otherwise, determine the operation system for processing the received information according to a setting command received.

In this technical scheme, if the received information is associated with information stored in the current operation system, the received information can be processed by an operation system corresponding to the stored information; otherwise, if the received information is not information associated with the designated contact of any operation system, it can be set that the received information will be processed directly in the current operation system, or it is also possible to determine whether the contact who pushed the information is a contact other than the designated contact of any operation system, and if yes, the any operation system will be used to process the information, otherwise, the information will be processed in the current operation system.

In the above-mentioned technical scheme, as an implementation, the information processing device 502 of the terminal 500 is configured to synchronously update the information of the designated contact of the any operation system stored in the current operation system if it is detected that the information of the designated contact of the any operation system is updated.

In this technical solution, a collection of part of the information of the designated contact of any operation system is stored in the current operation system, and when part of the information of the designated contact of any operation system is changed, the changes will be synchronized to the current operation system, so as to ensure that the current operation system can accurately determine the type of the received information based on the content of the information, in other words, to accurately determine whether the information is related to part of the information of the designated contact of any operation system, so as to determine the operation system for processing the received information. Through this technical scheme, the accuracy of judgment can be improved, and the security of user privacy can be better protected.

Figure 6:
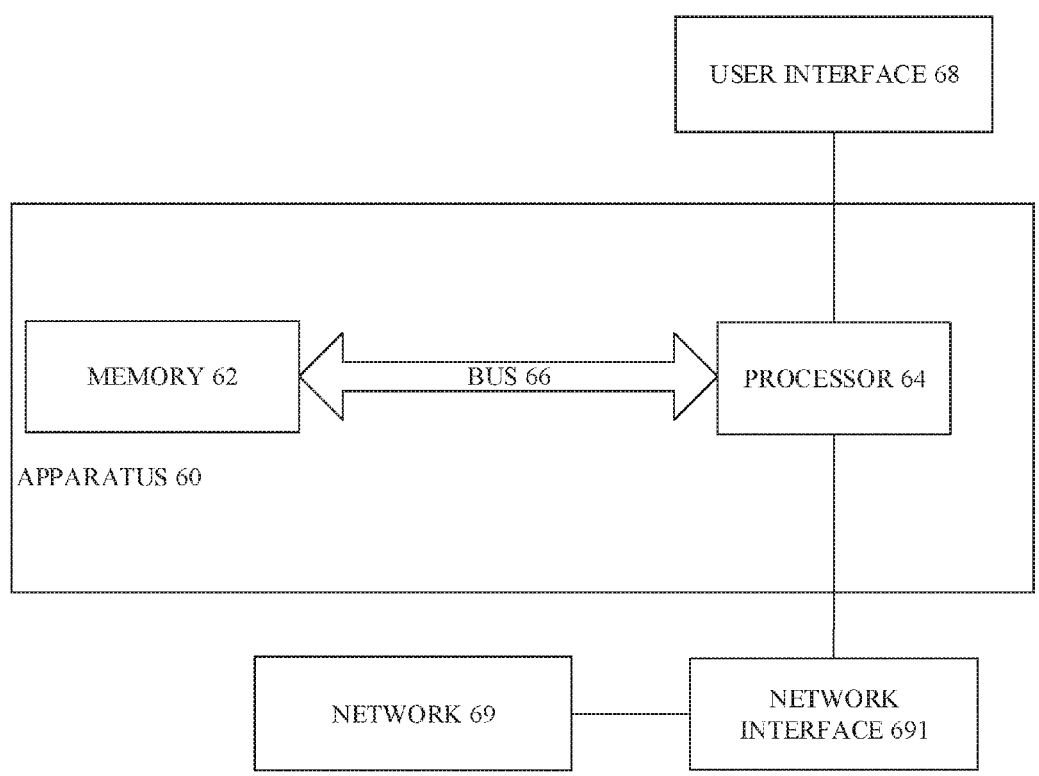
FIG. 6 is a block diagram illustrating an apparatus of the present disclosure.

According to another implementation of the present disclosure, it is provided an apparatus, and FIG. 6 is a block diagram illustrating the apparatus. As illustrated in FIG. 6, the apparatus 60 includes a memory 62 and at least one processor 64 (for clarity, only one is illustrated in the figure). The memory 62 and the processor 64 can be connected in a wired or wireless manner, for example, through a bus 66. For example, the apparatus 60 of the implementation can be a server or a terminal.

To be specific, the memory 62 is configured to store computer-readable program code, and can be ROM, RAM, CD-RAM, or any other removable storage medium; the processor 64 is configured to invoke the computer-readable program code stored in the memory 62 to execute predetermined process such as the methods according to the implementations of the present disclosure described above, to avoid unnecessarily obscuring the present disclosure, the details of the methods or process is not provided here. In addition, as shown in FIG. 6, the processor 64 can but not necessarily connect to an external device through a user interface 68 or to a network 69 through a network interface 691.

According to a further implementation of the disclosure, it is provided a computer-readable storage medium configured to store computer-readable program code, when executed on a data-processing apparatus, the program code is adapted to cause the data-processing apparatus to perform the methods as described in the above-mentioned implementations. In order to avoid unnecessarily obscuring the present disclosure, the details of these implementations will not be repeated here.

The computer-readable storage medium may be referred to as a non-volatile computer-readable storage medium or tangible computer-readable medium. Examples of computer-readable storage medium include but are not limited to: magnetic hard disk drive, solid state hard disk, flash memory, USB thumb drive, RAM, ROM, magneto-optical disk, and the register file of the processor.

The term computer readable-storage medium also refers to various types of recording media capable of being accessed by the computer device via a network or communication link. For example, data may be retrieved over a modem, over the internet, or over a local area network. References to a computer-readable storage medium should be interpreted as possibly being multiple computer-readable storage mediums. For example, the computer-readable storage medium can be multiple computer-readable storage medium within the same computer system, or, can be computer readable storage medium distributed among multiple computer systems or computing devices.

Through any of the technical schemes described above, it is possible to enhance the security of the information received by the terminal, to prevent the received privacy information related to any operating system from being revealed, to comprehensively protect the information received by the terminal that relates to data of any one of the operation systems, and to maximize the protection of the privacy of users.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for information processing for a terminal with multiple operation systems, comprising:
    storing information of a designated contact of each operation system of the multiple operation systems in a current operation system, wherein the information of the designated contact includes at least one of the following: an avatar, a name, a type, an email address, or a phone number of the designated contact;
    determining, by the terminal, a type of information received in a current operation system according to content of the information, wherein the content of the information comprises at least one of the following: the avatar, the name, the type, the email address, or the phone number of the designated contact of the information; and
    determining an operation system for processing the information according to the type of the information, and using the operation system to process the information,
    wherein the type of information comprises a security type and a non-security type, information of the security type is information related to the designated contact of any of the multiple operation systems, and information of the non-security type is information related to a contact other than the designated contact.

2. The method of claim 1, further comprising:
    updating the information of the designated contact of the any of the multiple operation systems stored in the current operation system synchronously upon detecting that the information of the designated contact of the any of the multiple operation systems is updated.

3. The method of claim 1, further comprising:
    updating the information of the designated contact of the operation system stored in the current operation system synchronously upon detecting that the information of the designated contact of the operation system is updated.

4. The method of claim 1, wherein determining the type of the information received in the current operation system according to the content of the information comprises:
    according to the content of the information received and information of the designated contact of each operation system stored in the current operation system, determining whether the information received is information related to the designated contact of any of the multiple operation systems.

5. The method of claim 4, wherein determining the operation system for processing the information according to the type of the information, and using the operation system to process the information comprises:
    based on a determination that the information received is the information related to the designated contact of any of the multiple operation systems, using the operation system to process the information; and
    based on a determination determined that the information received is not related to the designated contact of any of the multiple operation systems, determining the operation system for processing the information received according to a received setting command, and using the operation system to process the information.

6. The method of claim 4, further comprising:
    updating the information of the designated contact of the operation system stored in the current operation system synchronously upon detecting that the information of the designated contact of the operation system is updated.

7. A device for information processing for a terminal with multiple operation systems, comprising:
    a first determining unit, configured to determine a type of information received in a current operation system according to content of the information, wherein the content of the information received comprises at least one of the following: an avatar, a name, a type, an email address, or a phone number of a designated contact of the information;
    a second determining unit, configured to determine an operation system for processing the information according to the type of the information, wherein the type of information comprises a security type and a non-security type, information of the security type is information related to a designated contact of any of the multiple operating systems, and information of the non-security type is information related to a contact other than the designated contact;
    a processor, configured to use the operation system to process the information; and a storage united configured to store information of a designated contact of each operation system of the multiple operation systems in the current operation system, wherein the information of the designated contact includes at least one of the following: the avatar, the name, the type, the email address, or the phone number of the designated contact.

8. The device of claim 7, wherein the first determining unit is configured to:
determine whether the information received is information related to the designated contact of any of the multiple operation systems, based on the content of the information received and information of the designated contact of each operation system stored in the current operation system.

9. The device of claim 8, wherein the second determining unit is configured to:
determine to use the operation system to process the information based on a determination that the information received is the information related to the designated contact of any of the multiple operation systems; and
determine the operation system for processing the information received according to a received setting command, and using the operation system to process the information, based on a determination that the information received is not related to the designated contact of any of the multiple operation systems.

10. The device of claim 7, further comprising:
an updating unit, configured to update the information of the designated contact of the operation system stored in the current operation system synchronously upon detecting that the information of the designated contact of the operation system is updated.

11. An apparatus, comprising:
a processor; and
a memory, configured to store program codes when executed by the processor are adapted to cause the processor to:
store information of a designated contact of each operation system of multiple operation systems in a current operation system, wherein the information of the designated contact includes at least one of the following: an avatar, a name, a type, an email address, or a phone number of the designated contact;
determine a type of information received in the current operation system according to content of the information, wherein the content of the information received comprises at least one of the following: the avatar, the name, the type, the email address, or the phone number of the designated contact of the information; and
determine an operation system for processing the information according to the type of the information, and using the operation system to process the information, wherein the type of the information comprises a security type and a non-security type, the information of the security type is information related to a designated contact of any operation system of the multiple operation systems, and information of the non-security type is information related to a contact other than the designated contact.

12. The apparatus of claim 11, wherein the program codes to determine the type of the information received in the current operation system further comprise program codes to:
according to the content of the information received and information of the designated contact of each operation system stored in the current operation system, determine whether the information received is information related to the designated contact of any of the multiple operation systems.

13. The apparatus of claim 12, wherein the program codes to determine the operation system for processing the information further comprise program codes to:
based on a determination that the information received is the information related to the designated contact of any of the multiple operation systems, using the operation system to process the information; and
based on a determination that the information received is not related to the designated contact of any of the multiple operation systems, determining the operation system for processing the information received according to a received setting command, and using the operation system to process the information.

14. The apparatus of claim 11, wherein the memory further comprises program codes to:
update the information of the designated contact of the operation system stored in the current operation system synchronously upon detecting that the information of the designated contact of the operation system is updated.

* * * * *